Dec. 16, 1947.  J. N. JOSEFIAK  2,432,574
SELF-LOCKING AWNING OPERATING DEVICE
Filed Feb. 18, 1946
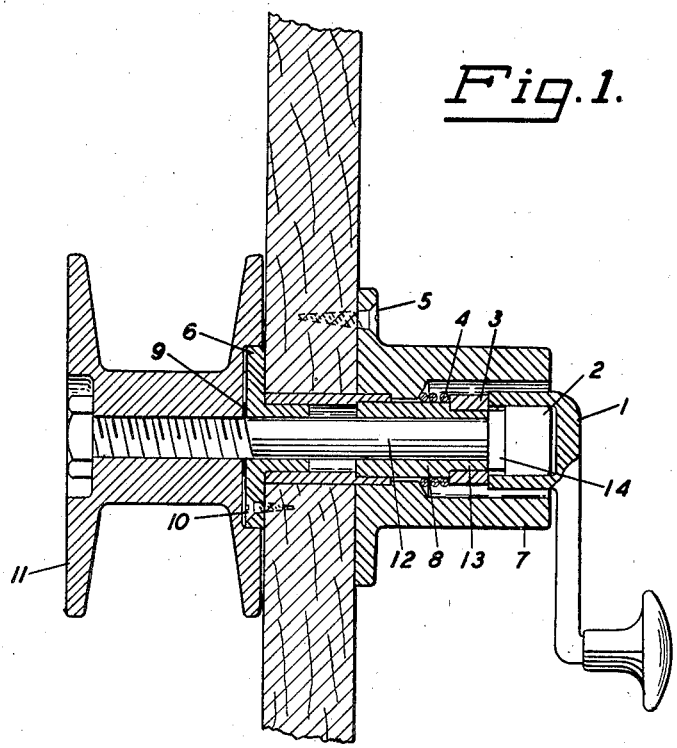
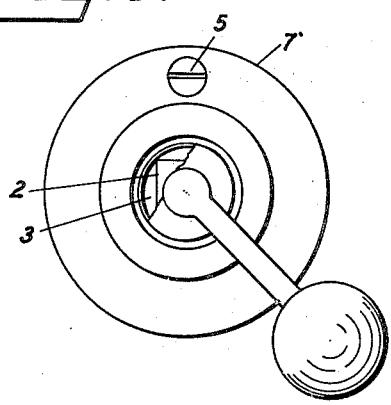
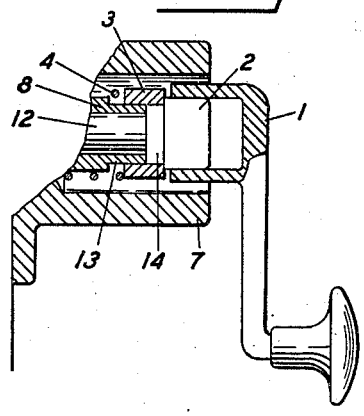
INVENTOR.
John N. Josefiak Patented Dec. 16, 1947

2,432,574

UNITED STATES PATENT OFFICE 2,432,574

SELF-LOCKING AWNING OPERATING DEVICE

John N. Josefiak, Buffalo, N. Y.

Application February 18, 1946, Serial No. 648,325

3 Claims. (Cl. 74—528)

My invention relates to improvement in machines used for operating and locking awnings, in which a spring actuated sleeve operates in conjunction with a spline or squared surface upon a fixed boss and a spline or squared surface of identical shape and outline positioned upon the operating shaft of the mechanism to lock the operating shaft in position when not in use, and the objects of my invention are; first to provide a self-locking mechanism for operating awnings, second to provide a means of operating awnings from within the building to which they are attached.

I attain these objects by the mechanism illustrated in the accompanying drawing, in which—

Figure 1 is a cross-section drawing of the entire mechanism as adapted to a pulley on the operating shaft for raising and lowering awnings; Figure 2 is a cross-section of the mechanism in locked position; Figure 3 is an end view of the mechanism from the operating side.

Similar numerals refer to similar parts throughout the several views.

The housing 7 the boss 8 and the flange 6 comprise the framework of the machine, in the flange 6 and the boss 8 the operating shaft 12 turns when sleeve 3 is moved back against the compression of spring 4 and along spline or squared surface 13 on boss 8 and out of engagement with spline or squared surface 14 on shaft 12 by the hand-crank 1 which engages a square lug 2 on the end of shaft 12. When hand-crank 1 is removed, sleeve 3 is moved over both spline or squared surface 13 on boss 8 and spline or squared surface 14 on shaft 12 engaging both and locking shaft 12 to the fixed boss 8 by the action of spring 4 actuating the sleeve 3.

Nos. 5 and 10 represent attaching screws in this through-the-wall mounting, 9 a washer and 11 the pulley to which the awning cord may be attached.

In Figure 2 the hand crank 1 is shown in disengaged position on square lug 2 on shaft 12 with sleeve 3 engaging spline or squared surface 13 on boss 8 and spline or squared surface 14 on shaft 12 locking both together.

I am aware that prior to my invention pulleys in conjunction with ratchets or friction type locking devices and hand cranks have been used. I therefore do not claim such a combination broadly but I claim:

1. In a windlass including a drum, a shaft for driving the drum, and a support mounting the shaft for rotation therein, a bearing element fixed to said support and journalling one end of said shaft, a detent sleeve carried by said bearing element and slidable axially along said bearing element from a position in which said sleeve locks said shaft to said bearing element to a position in which said shaft is unlocked from said bearing element, resilient means normally urging said sleeve into a position in which said sleeve locks said shaft to said bearing element, and a handle adapted to slide axially along said shaft in continuous torque-transfer engagement therewith to urge said sleeve into a position in which said shaft is unlocked from said bearing element.

2. A windlass comprising a drum, a shaft for driving said drum, a bearing element mountable upon a support and journalling said shaft, a detent sleeve carried by said bearing element and slidable axially therealong, first complementary locking means on said bearing element and said sleeve, second complementary locking means on said shaft and said sleeve, said sleeve being slidable from a first position in which said first and second complementary means are both engaged to a second position in which said first complementary means are engaged and said second complementary means are disengaged, resilient means normally urging said sleeve into said first position, a handle adapted to slide axially along said shaft in continuous torque-transfer engagement therewith, and cooperating elements on said handle and said sleeve for urging said sleeve to said second position upon sliding movement of said handle.

3. A windlass comprising a drum, a shaft for driving said drum, a bearing element mountable upon a support and journalling said shaft, a detent sleeve carried by said bearing element and slidable axially therealong, first complementary locking means on said bearing element and said sleeve, second complementary locking means on said shaft and said sleeve, said sleeve being slidable from a first position in which said first and second complementary means are both engaged to a second position in which said first complementary means are engaged and said second complementary means are disengaged, spring means normally urging said sleeve into said first position, a handle adapted to slide axially along said shaft in continuous torque-transfer engagement therewith, and cooperating elements on said handle and said sleeve for urging said sleeve to said second position upon sliding movement of said handle.

JOHN N. JOSEFIAK.

REFERENCES CITED

The following references are of record in the file of this patent:

UNITED STATES PATENTS

| Number | Name | Date |
|---|---|---|
| 1,719,850 | Price | July 9, 1929 |

FOREIGN PATENTS

| Number | Country | Date |
|---|---|---|
| 571,458 | Germany | Feb. 28, 1933 |